July 2, 1957 M. H. NOVEMBER 2,798,146
BELLOWS WELDING APPARATUS
Filed July 24, 1953 4 Sheets-Sheet 1
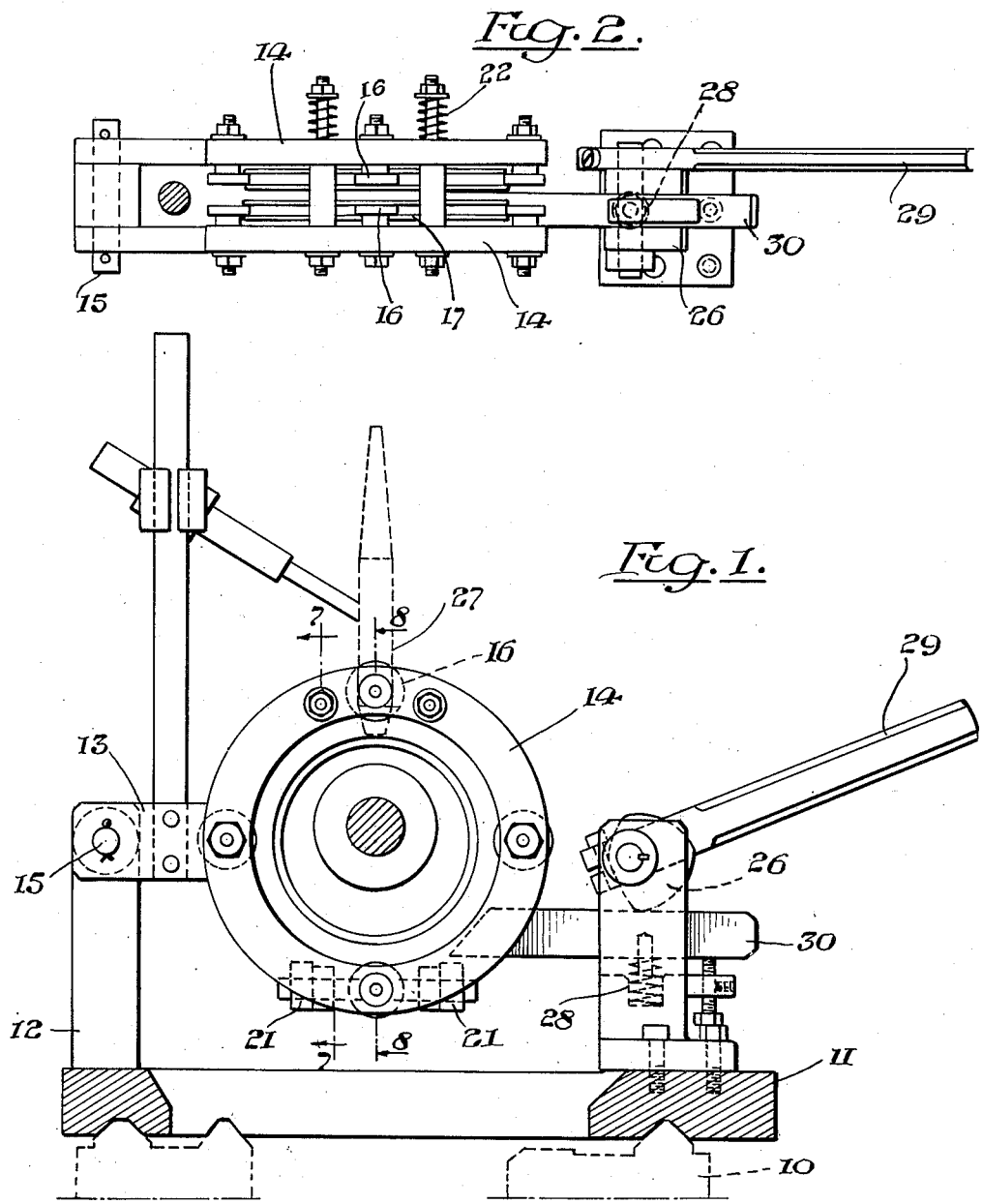
INVENTOR.
Milton H. November
BY Albert F. Krouman
ATTORNEY July 2, 1957 M. H. NOVEMBER 2,798,146
BELLOWS WELDING APPARATUS
Filed July 24, 1953 4 Sheets-Sheet 2

INVENTOR.
Milton H. November
BY Albert F. Kronman
ATTORNEY

July 2, 1957  M. H. NOVEMBER  2,798,146
BELLOWS WELDING APPARATUS
Filed July 24, 1953  4 Sheets-Sheet 3

INVENTOR.
Milton H. November
BY Albert F. Kronman
ATTORNEY

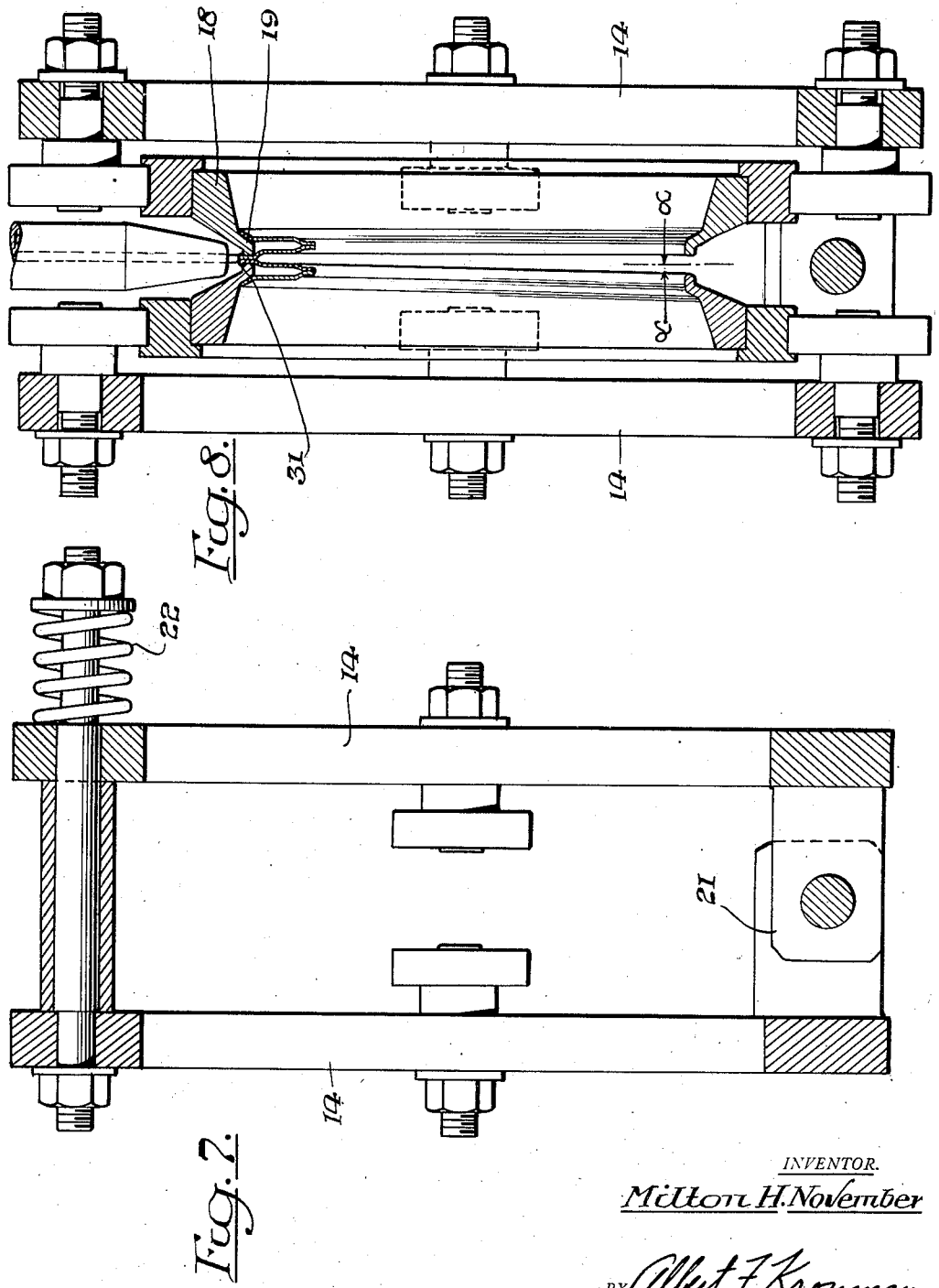

United States Patent Office 2,798,146
Patented July 2, 1957

2,798,146

BELLOWS WELDING APPARATUS

Milton H. November, East Orange, N. J., assignor to Breeze Corporations, Inc., Newark, N. J., a corporation of New Jersey Application July 24, 1953, Serial No. 370,067

3 Claims. (Cl. 219—124)

This invention relates to a device and method for welding external seams on disc-shaped bellows elements. In the formation of metal bellows comprising a plurality of disc-shaped elements alternately welded at their inner and outer peripheries, it is necessary to grasp the elements to be welded firmly at the point of welding, and thereafter release said elements once the weld bead has been formed. Where thin-bellows elements are to be welded together, it is essential to overcome work warpage resulting from the welding process.

Accordingly, it is an object of the present invention to provide a bellows welding device and method, wherein extremely thin bellows elements may be secured together, in a uniform continuous manner.

Another object of the present invention is to provide a bellows welding device, which will exert a positive pressure on the bellows elements to be welded, in close proximity to the point where the weld is being made.

A further object of the present invention is to provide a bellows welding device which will lend itself readily to satisfactory production performance.

A further object of the present invention is to provide a bellows welding device, which will eliminate work warpage from the welding process.

A feature of the present invention is the provision of rings for grasping the bellows elements, which rings serve as effective heat-conducting media to control the flow of heat from the welding zone.

Another feature of the present invention comprises means for removing and inserting work members between the holding rings.

A further feature of the present invention is the specific configuration of the holding rings, whereby they form effective inert atmosphere gas pockets in welding processes, such as the heli-arc welding technique.

The invention consists of the construction, combination and arrangements of parts, as herein illustrated, described and claimed.

In the accompanying drawings, forming a part hereof, is illustrated one complete form of embodiment of the invention, in which drawings similar reference characters designate corresponding parts, and in which:

Figure 1 is a view in side elevation showing a complete bellows welding device, made in accordance with the present invention.

Fig. 2 is a top plan view of the bellows welding device shown in Fig. 1.

Fig. 7 is a vertical cross-section of the bellows welding device frame, taken on line 7—7 of Fig. 1, showing the hinged construction thereof.

Fig. 8 is a vertical section of the bellows welding device, taken on line 8—8 of Fig. 1, showing the manner in which the peripheries of adjacent bellows elements are welded.

Figure 3:
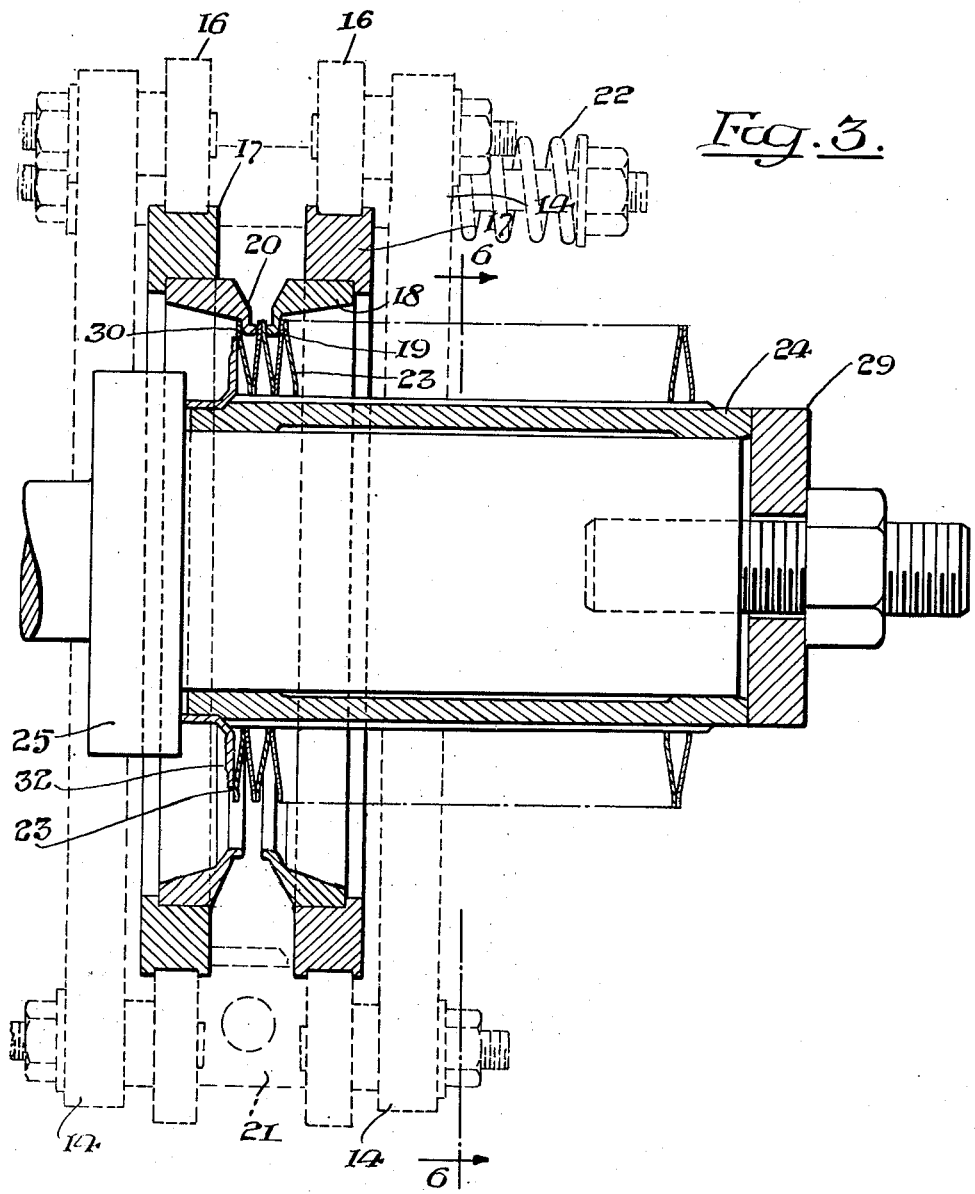
Fig. 3 is a vertical section, somewhat enlarged, of a bellows welding device, made in accordance with the present invention.
Figure 4:
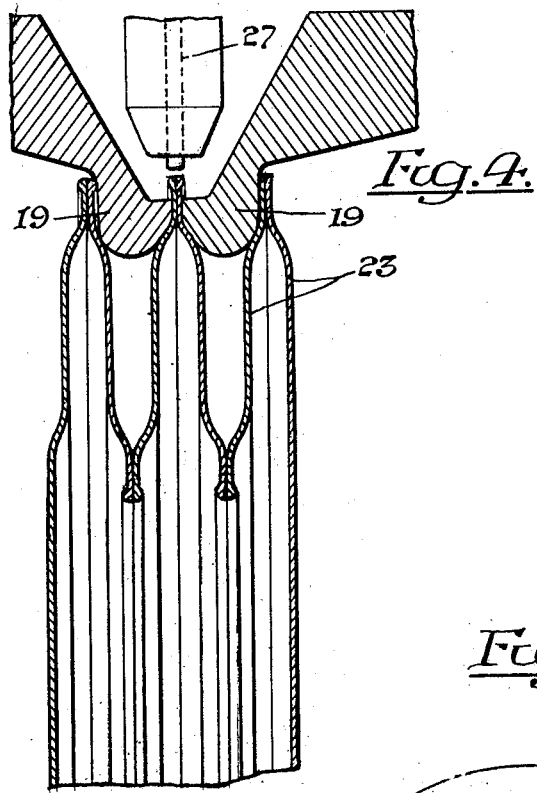
Fig. 4 is a fragmentary vertical section, somewhat enlarged, showing the bellows grasping rings and bellows elements therebetween, in the welding position.

Referring to the drawings, and particularly to Figs. 1, 2, and 3, 10 indicates a lathe bed or other suitable support, to the top of which is secured a plate 11. A vertical post 12 is secured to the plate 11 and supports at the top thereof an arm 13. Spaced frame assembly members 14 are swingably secured to the post 12, as indicated at 15. The frame assembly members 14 are provided with ball-bearing rolls 16, which serve to support therebetween adapters 17, which in turn hold the welding rings 18, alternately, the rings 18 may ride directly on rolls 16. The welding rings 18, best shown in Figs. 3, 4, are formed with a configuration which enables them to grasp the periphery of the bellows elements therebetween, and hold said elements securely together at the welding station.

The rings 18 grasp the bellows elements by means of complementary extending lip portions 19 formed on the inside diameter of the rings 18. The complementary lips 19 form between them a well or pocket 20 which serves as an inert atmosphere gas pocket. The inert atmosphere gas pocket 20 co-operates in the operation of the bellows welding device, and particularly in using the heli-arc welding process which is preferred in conjunction with the present structure. The heli-arc welding process employs a blast of helium which is directed around the electrode toward the work to be welded. When the arc is struck the work to be welded melts under the intense heat and is fused together without any substantial burning of the electrode.

The spaced frame members 14 are hinged together as shown at 21 in Figs. 1 and 7. The frames 14 are held in a closed position by means of springs 22, located opposite the hinge members 21. Because of the operation of the hinges 21 and the springs 22, the frames 14 exert a pressure upon the rings 18, tending to force the said rings together.

The bellows elements which are to be welded comprise generally washer-shaped disc members 23, which have been previously formed in a suitable manner, so as to render them flexible and capable of withstanding great pressures. The bellows elements 23 are preferably welded together along their inner peripheries, before insertion within the bellows welding device. However, it is within the purview of the present invention to weld bellows members internally, as well as to perform the external welding illustrated in the accompanying drawings.

The bellows elements 23 which may have been previously welded internally, are placed upon an arbor 24, which is driven in a suitable manner, as by being attached to a lathe spindle (not shown). The arbor 24 is provided with an end flange 25, to which the first bellows element 23 is secured, as shown in Fig. 3.

The rings 18 are lowered over and grasp the elements 23 therebetween as shown in Figs. 3 and 8. Lowering the rings 18 is achieved by means of swinging the frame member 14, which turns upon the pivot 15. A cam 26 and a lever 29 keyed thereto, serve to govern the rotation of the rings, as hereinafter more fully described.

The inside diameter of the rings 18 is greater than the outside diameter of the bellows elements 23. Thus, as the frames and rings 18 are lowered upon the bellows elements 23, the opposed lips 19 force the elements 23, together, until they assume the position shown in Fig. 4.

Because of friction between the bellows elements 23 to be welded and the rings 18 created by the pressure of the springs 22, both of the rings 18 rotate with the work to be welded as the mandrel 24 is turned.

As the mandrel 24 and the elements 23 rotate, an electric arc is struck between the electrode 27 and the bellows plate elements 23, welding the latter together. When the welding has completed a 360° traverse the gas flow is interrupted, and the frames 14 are raised by means of the spring 28, which is located immediately below the arm 30, against which the cam 26 bears. The spring 28 forces the arm 30 upwardly when the cam actuating lever 29 is raised. As each bellows convolution is welded, the assembly of welded bellows is moved one pitch distance along the work supporting arbor and the ring engaging and welding operation repeated, until all of the bellows elements 23 have been welded into an entire bellows structure.

An important feature of the present bellows welding device is the geometric arrangement of the rings 18, with respect to the work. The disposition of the rings 18, best shown in Fig. 8, is such that the bellows elements are continuously released from between the rings 18 after the weld bead 31 has been formed. This release is accomplished without shifting the point of application of pressure by the rings 18 on the bellows elements 23.

Referring to Fig. 8, it will be seen that the weld bead 31 is of greater thickness than the combined thickness of the two bellows elements 23, which are joined thereby.

Accordingly, after the bead has been formed, the problem arises of continuously removing the ring members 18 from contact with the bead 31, without riding on the said bead. For this purpose, the rings 18 are carried within the frame 14 at a slight angle with respect to each other, as indicated at α in Fig. 8.

It is within the purview of the present invention, however, to make the angle α at which the rings are set, such that with sufficient pressure on the rings 18, they may also size the width of the welding bead 31, and in so doing, impart a degree of working to the weld cast. The physical properties of the weld metal may thereby be improved. The working of the weld bead 31 will be aided by the fact that at the time the bead passes between the lips 19, it is still fairly plastic (having an elevated temperature), so that bead sizing may be accomplished by the ironing action of the rings 18, with a small pressure and with minimal work loads.

Bellows convolutions made from light gauge metals have a tendency to warp to a marked degree upon the completion of the inside diameter weld. In providing saleable bellows, it becomes necessary to insure that the warped convolutions are straight in the final assembly. However, bellows made in accordance with the previously disclosed method and device, are formed straight and free of waviness in the individual convolutions.

Figure 5:
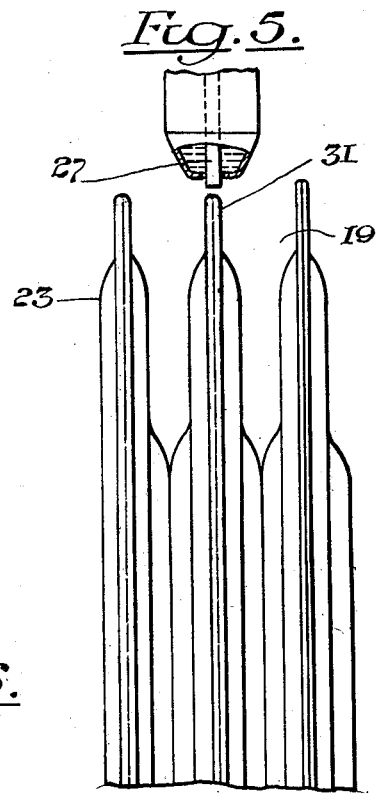
Fig. 5 is a fragmentary view in side elevation, somewhat enlarged, showing the bellows elements and welding electrodes illustrated in Fig. 4.
Figure 6:
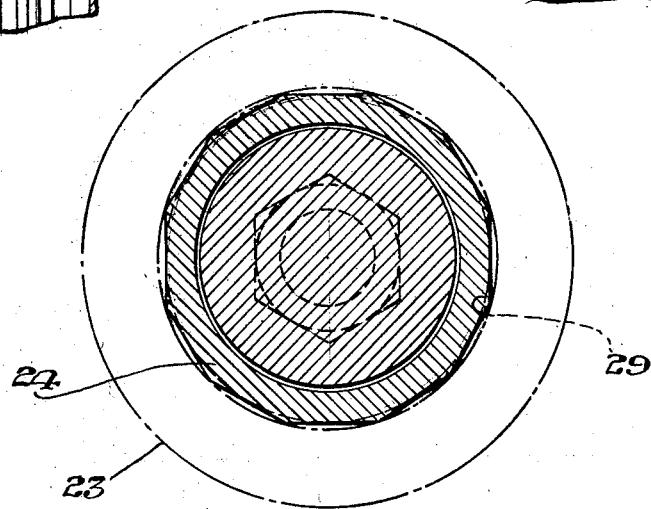
Fig. 6 is a cross-sectional view taken on line 6—6 in Fig. 3.

The straightening process is accomplished in the following manner: As a result of the inherent characteristics of the structure disclosed herein, individual convolutions of the bellows are stretched as to pitch, by the rims 19 of the rings 18, which rims are wider than the space between the elements 23 comprising a single convolution. (See Fig. 5.) This stretching action removes some of the convolution waviness. The initial "warped convolution," comprising the first bellows element 23 is first welded to an end flange 32, best shown in Fig. 3. The end flange 32 is of heavier gauge than the bellows element, and is flat, so as to provide a good foundation which will prevent build-up of warpage along the assembled bellows structure.

Additionally, the convolutions to be welded are held in relatively flat relationship over the arc of engagement between the rings 18 during the welding portion of the cycle. Bellows built up in the manner set forth hereinbefore, having as many as 16 convolutions were formed straight, and free of objectionable waviness throughout the entire structure.

It is within the purview of the present invention to adapt the above described bellows welding apparatus to an automatic welding machine by adding thereto mechanical means for engaging and disengaging the frame assembly and the ring elements 23; and providing pitch indexing mechanisms which will move elements when welded past the rings 18 at a distance suitable for enabling said rings 18 to engage the succeeding elements to be welded, during each stage of the operation.

Additionally, work feeding apparatus may be provided to feed individual bellows elements 23 onto the mandrel, so as to supply the welding device with work parts. A revolution counting control may be added, whereby once the weld has been completed through a rotation of 360°, the welding operation will be stopped, and its disengaging indexing and re-engaging apparatus permitted to operate. All of the above mechanical functions can be readily tied together in sequence by conventional methods presently well known in the art.

Having thus fully described the invention, what is claimed as new and desired to be secured by Letters Patent of the United States, is:

1. A device for welding disc-shaped elements into a bellows assembly comprising, a base plate, a post secured to said base, oppositely disposed frames secured together at their lower portions and swingably attached to the post, resilient latching means connecting the upper portions of the frames, a clamping ring having an annular projection on the inner peripheral face thereof journaled in each frame, said rings being disposed at a small angle relative to each other and being closest together at only one point, a welding station carried by the plate, a metal welding electrode in said welding station, said welding electrode being directed at the point of closest proximity of the rings, a mandrel on the base support extending within the rings, the axis of said mandrel being parallel to, but lying above the ring axis, and means for moving the rings and frames up and down relative to the base and the mandrel.

2. A device for welding disc-shaped elements into a bellows assembly comprising, a base plate, a post secured to said base, oppositely disposed frames secured together at their lower portions and swingably attached to the post, a hinge-like member connecting the said frames at the bottom thereof, resilient latching means connecting the upper portions of the frames, a clamping ring having an annular projection on the inner peripheral face thereof journaled in each frame and extending in the direction of the opposite ring to form a pocket between the said rings, said rings being disposed at a small angle relative to each other and being closest together at only one point, a welding station carried by the plate, a metal welding electrode in said welding station, said welding electrode being directed at the point of closest proximity of the rings and within the ring pocket, a mandrel on the base support extending within the rings, the axis of said mandrel being parallel to, but lying above the ring axis, and means for moving the rings and frames up and down relative to the base and the mandrel.

3. A device for welding disc-shaped elements into a bellows assembly comprising, a base plate, a post secured to said base, oppositely disposed frames secured together at their lower portions and swingably attached to the post, a hinge-like member connecting the said frames at the bottom thereof, resilient latching means connecting the upper portions of the frames, a clamping ring having an annular projection on the inner peripheral face thereof journaled in each frame, said projection extending in the direction of the opposite ring to form a pocket between the said rings, said rings being disposed at a small angle relative to each other and being closest together at only one point, a welding station carried by the plate, a metal welding electrode in said welding station, said welding electrode being directed at the point of closest proximity of the rings and within the ring pocket, a mandrel on the base support extending within the rings, the axis of said mandrel being parallel to, but lying above the ring axis, and means for rotating the mandrel and moving the rings and frames up and down relative to the base and the mandrel to alternately drive and release the bellows elements.

References Cited in the file of this patent

UNITED STATES PATENTS

| | | |
|---|---|---|
| 432,651 | Thomson | July 22, 1890 |
| 2,041,461 | Floyd et al. | May 19, 1936 |
| 2,347,185 | Fentress | Apr. 25, 1944 |
| 2,667,137 | Osterman et al. | Jan. 26, 1954 |